3,312,694
N-TERTIARY AMINOMETHYL-SUCCINIMIDES
Jenö Seres, László Tardos, and György P. Leszkovszky, Budapest, Hungary, assignors to Chinoin Gyógyszer-és Vegyészeti Termékek Gyára Rt., Budapest, Hungary, a firm
No Drawing. Filed July 5, 1963, Ser. No. 293,200
Claims priority, application Hungary, July 13, 1962, CI–404
6 Claims. (Cl. 260—247.2)

This invention is related to new pharmaceuticals and methods for preparing the same. More particularly it is related to certain new succinimide derivatives and chemical methods for their preparation.

It has been found, that succinimide derivatives of the general formula

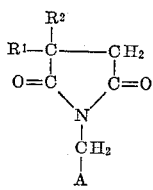

(where $R^1$ stands for hydrogen, an aryl, aralkyl, alkyl, or heterocyclic group, $R^2$ stands for an aryl, aralkyl, heterocyclic or alkyl group, or $R^1$ and $R^2$ are united to form together a cyclic system, while A stands for a disubstituted amino group) and their salts are valuable compounds which may be used in pharmacy especially in treatment of epilepsia.

Compounds, where $R^1$ stands for an alkyl group (e.g. methyl, ethyl) while $R^2$ stands for an alkyl group or an aromatic cycle (e.g. methyl, ethyl, phenyl) show advantageous pharmaceutical properties.

A further group of preferred products are compounds where A stands for aryl, aralkyl, or heterocyclic amines which are substituted on the aromatic or heterocyclic cycle. Thus the compounds where A stands for a dialkyl-amino-, piperazino-, indol-, piperidino-, ephedrino-, or morpholino-group were found to be effectual. These groups may contain substituents e.g. alkyl or alkoxy groups, halogen or in the case of heterocyclic derivatives, aromatic groups.

The above compounds may be used in the form of the free bases, or in the form of their salts, formed with mineral or organic acids. Thus halogenides, sulphates, acetates, formates, citrates, borates, or phosphates etc. of the compounds are provided. The salts of the products may be converted into the free bases by known methods.

It has further been found, according to the present invention, that the above products may be prepared by subjecting compounds of the formula

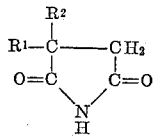

to a Mannich reaction.

When carrying out this reaction, the compounds of Formula II are reacted with an appropriate amine and formaldehyde in the form of an aqueous formaldehyde solution or paraformaldehyde. However, one may use compounds which are capable to deliver formaldehyde on the course of the reaction in the reaction mixture (e.g. hexamethylene tetramine etc.). The Mannich reaction may be carried out preferably in an organic solvent or in an aqueous medium. Thus anhydrous or aqueous alcohols may be used with success. The temperature range of the reaction may be chosen between room temperature and the boiling point of the solvent employed. It is preferable to admix the reagents at room temperature, and subsequently subject the reaction mixture to heating in order to complete the reaction.

According to the present invention, pharmaceutical compositions are provided containing as active ingredients at least one succinimide derivative of Formula I. The pharmaceutical compositions may contain additional compounds having themselves pharmaceutical activity. The said pharmaceutical compositions may be in form suitable for oral, rectal or parenteral use. The compositions may contain sweetening, flavouring, colouring and preserving agents. Compositions intended for oral use may be prepared according to any method known to the art for the manufacture of pharmaceutical compositions, such as tablets, coated pills, suspensions, solutions, powders or granules, capsules, emulsions, etc. The tablets may contain non-toxic pharmaceutical excipients commonly used in the manufacture of tablets, thus they may contain lubricating, binding, granulating and disintegrating agents, diluents, etc.

Suspensions or solutions may contain the following excipients: suspending agents, dispersing or wetting agents, preservatives, thickening agents, etc. Powders and granules may contain wetting and suspending agents.

The pharmaceutical compositions may be in the form of a sterile injectable preparation, such as an aqueous solution or suspension, or in another non-toxic parenterally acceptable diluent or solvent.

The compounds according to the invention or their salts may be used for the treatment of humans preferably in 0.2 to 0.6 g. doses when administered perorally or in 5% aqueous injection solutions.

Further details of the invention are to be found in the examples.

*Examples*

(1) 4.73 g. of α-phenyl-α-methyl-succinimide and 2 ml. of a concentrated aqueous formaldehyde solution are admixed with 2.5 ml. of piperidine, whereupon the reaction mixtures gets warm. After 30 minutes refluxing 2 ml. of water containing formaldehyde are distilled off. 10 ml. of 96% ethanol are added to the oily residue while still warm. On cooling a crystalline product precipitates, which is filtered and dried. 4.7 g. of α-phenyl-α-methyl-N - (piperidyl - methyl) succinimide are obtained. M.P.: 85–87° C.

Pharmacological tests of the above compound showed the following results: the compound effects strichnine-spasm ($ED_{50}=170$ mg./kg.), pentamethylene-tetrazol spasm ($ED_{50}=62$ mg./kg.) and electroshock-inhibition ($ED_{50}=195$ mg./kg.). The peroral toxicity of the product amounts to $DL_{50}=1900$ mg./kg. (on mice).

(2) 4.73 g. of α-phenyl-α-methyl-succinimide and 2.18 ml. of morpholine are admixed with 2 ml. of a concentrated aqueous formaldehyde solution. The reaction mixture gets warm, whereupon it is refluxed for 30 minutes. Water and the excess of formaldehyde are distilled off in vacuo and the residual oil is crystallized from 20 ml. of 96% alcohol. On cooling crystals precipitate, which are filtered, washed and dried. 5.73 g. of α-phenyl-α-methyl-N-(morpholinylmethyl)-succinimide are obtained. M.P.: 68–70° C.

2 g. of the above product are dissolved in 5 ml. of anhydrous ethanol, whereupon 32 ml. of ethanol containing hydrochloric acid are added. The solution is filtered and on standing for some time white crystals precipitate. The crystals are filtered, washed and dried. Thus 1.7 g. of α-phenyl-α-methyl-N-(morpholinyl-methyl)-succinimide hydrochloride are obtained. M.P.: 177° C.

α-phenyl-α-methyl-N - (morpholinyl - methyl) - succinimide exhibits strichine-spasm inhibitory ($ED_{50}=62$ mg./kg.), pentamethylene-tetrazol spasm inhibitory ($ED_{50}=145$ mg./kg.) and electroshock inhibitory ($ED_{50}=47$ mg./kg.) effect. The toxicity of the product was found to be $DL_{50}=2000$ mg./kg. perorally (on mice).

(3) 7.05 g. of α-methyl-α-ethyl-succinimide, 4.25 g. of piperidine and 4 ml. of a concentrated aqueous formaldehyde solution are admixed; whereupon the solution grows warm and is refluxed for an hour. The excess of water and formaldehyde are distilled off in vacuo and the residue is crystallized from 15 ml. of anhydrous alcohol.

On standing in a refrigerator the precipitated crystals are filtered. 4.8 g. of α-methyl-α-ethyl-N-(piperidyl-methyl)-succinimide are obtained. M.P.: 48–50° C.

(4) 7.05 g. of α-methyl-α-ethyl-succinimide, 4.35 ml. of morpholine and 4 ml. of a concentrated aqueous formaldehyde solution are admixed at room-temperature, whereupon the reaction-mixture gets warm and is then refluxed for an hour. Water and the unreacted formaldehyde are distilled off and the residue yellowish oil is crystallized from 15 ml. of anhydrous alcohol. The precipitated crystals are filtered, washed with alcohol and dried. 5.23 g. of α-methyl-α-ethyl-N-(morpholinyl-methyl)-succinimide are obtained. The product can be recrystallized from alcohol. M.P.: 53–55° C.

(5) 4.38 g. of α-phenyl-succinimide, 2.18 ml. of morpholine and 2 ml. of concentrated aqueous formaldehyde solution are admixed at room-temperature and refluxed for 20 minutes. Water is distilled off in vacuo and the residual oil is crystallized from 10 ml. of alcohol. 4.28 g. of α-phenyl-N-(morpholinyl-methyl)-succinimide are obtained. M.P. 107–108° C. On recrystallization from ethanol the melting point amounts to 115–117° C.

(6) 4.38 g. of α-phenyl-succinimide are reacted with 2.5 ml. of piperidine and 2 ml. of formaldehyde according to the method described in the previous example. After eliminating the solvent the residual oil is crystallized from 10 ml. of ethanol. Thus 3.69 g. of dry α-phenyl-N-(piperidyl-methyl)-succinimide are obtained. The product may be recrystallized from ethanol. M.P.: 94–97° C.

(7) 3.78 g. of phenyl-methyl-succinimide are refluxed for an hour with 2 ml. of formaldehyde and 3.3 g. of ephedrine in 10 ml. of 96% alcohol. The alcohol is distilled off in vacuo and the residual oily material is crystallized by adding alcohol. The reaction mixture is cooled, the precipitated crystals are filtered, washed with alcohol and dried. Thus 2.42 g. of α-phenyl-α-methyl-N-(ephedrinyl-methyl)-succinimide are obtained.

(8) 1.53 g. of α-spiro-tetramethylene-succinimide are admixed with 0.87 g. of morpholine and 2 ml. of concentrated formaldehyde solution are added. The reaction mixture is refluxed for about 30 minutes, whereupon water and the excess of formaldehyde are distilled off in vacuo. The residual oil is crystallized from a mixture of water and acetone. 0.45 g. of the product are obtained as a first generation, melting at 84–85° C. The weight of the second generation amounts to 0.28 g., M.P. 85–86° C. Thus 0.73 g. of α-spiro-tetramethylene-N-(morpholinyl-methyl)-succinimide are obtained.

(9) The components are compounded and finished in form of tablets or coated pills according to usual methods. The composition of a tablet is the following:

| | G. |
|---|---|
| α - phenyl - α - methyl - N - (morpholinyl - methyl)-succinimide | 0.5000 |
| Amylum solani | 0.0820 |
| Talcum | 0.0100 |
| Magnesium stearate | 0.0080 |
| | 0.6000 |

What we claim is:

1. α - Phenyl - α - methyl - N - (piperidino - methyl)-succinimide.
2. α - Phenyl - α - methyl - N - (morpholino - methyl)-succinimide.
3. α - Methyl - α - ethyl - N - (morpholino - methyl)-succinimide.
4. α - Phenyl - N - (morpholino - methyl) - succinimide.
5. α - Spiro - tetramethylene - N - morpholino - methyl-succinimide.
6. A composition of matter selected from the group consisting of:

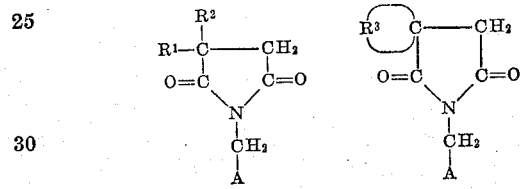

wherein $R^3$ is tetramethylene, $R^1$ is selected from the group consisting of hydrogen and methyl, $R^2$ is selected from the group consisting of phenyl and ethyl with the proviso that when $R^1$ is hydrogen $R^2$ is phenyl and A is selected from the group consisting of piperazino, piperidino, pyrrolidino, morpholino and ephedrino and pharmaceutically acceptable salts thereof.

References Cited by the Examiner

UNITED STATES PATENTS

| 1,915,334 | 6/1933 | Salzberg et al. | 260—243 |
| 2,075,359 | 3/1937 | Salzberg et al. | 167—22 |
| 2,425,320 | 8/1947 | Hill | 252—149 |
| 2,479,690 | 8/1949 | Morey | 260—294 |
| 2,606,155 | 8/1952 | Hill | 252—149 |
| 2,745,836 | 5/1956 | Suter | 260—326.5 |
| 2,867,619 | 1/1959 | Biel | 260—247.2 |
| 2,890,985 | 6/1959 | Marsh et al. | 167—65 |
| 2,902,404 | 9/1959 | Spencer | 167—65 |

OTHER REFERENCES

Winstead et al.: J. of Chem. and Eng. Data, vol. 7, pages 414, 415, July (1962).

ALEX MAZEL, *Primary Examiner.*

NICHOLAS S. RIZZO, HENRY R. JILES, *Examiners.*

JOSE TOVAR, *Assistant Examiner.*